United States Patent
Yang et al.

(10) Patent No.: US 7,406,737 B2
(45) Date of Patent: Aug. 5, 2008

(54) WASHING MACHINE AND CONTROL METHOD THEREOF

(75) Inventors: Byoung Yull Yang, Ansan-Si (KR); Hyung Gyoon Kim, Suwon-Si (KR); Sang Yeon Pyo, Suwon-Si (KR); Seon-Woo Park, Suwon-Si (KR); Hye Soon Yang, Yongin-Si (KR); Seong Min Oak, Masan (KR); Seung Ju Choi, Suwon-Si (KR); Jae-Ryong Park, Suwon-Si (KR); Hyun Sook Kim, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 10/850,383

(22) Filed: May 21, 2004

(65) Prior Publication Data
US 2005/0132503 A1 Jun. 23, 2005

(30) Foreign Application Priority Data
Dec. 23, 2003 (KR) .................. 10-2003-0095535

(51) Int. Cl.
*D06F 35/00* (2006.01)
(52) U.S. Cl. ..................... 8/158; 68/12.18; 68/12.22
(58) Field of Classification Search ............ 68/12.18, 68/12.22; 8/158
See application file for complete search history.

(56) References Cited
U.S. PATENT DOCUMENTS
4,782,544 A * 11/1988 Nystuen et al. ............. 8/159
4,856,301 A * 8/1989 Broadbent ................. 68/12.23
6,585,781 B1 7/2003 Roseen

FOREIGN PATENT DOCUMENTS

| EP | 1275767 | * | 1/2003 |
| IT | EP 0496708 | * | 7/1992 |
| JP | 48-36785 | * | 11/1973 |
| JP | 04-158896 A | | 6/1992 |

* cited by examiner

*Primary Examiner*—Michael Barr
*Assistant Examiner*—Jason Heckert
(74) *Attorney, Agent, or Firm*—Sughrue Mion, PLLC

(57) ABSTRACT

A drum type washing machine in which wash water and laundry contained in a rotating tub are heated by steam supplied into the rotating tub, so as to rapidly increase the temperature of the wash water and laundry, thereby being capable of reducing the total wash time while reducing the amount of wash water to be used, and reducing the consumption of energy caused by heating of the wash water. The washing machine includes a steam generating unit for heating water supplied thereto, thereby generating steam, and a control unit for rotating the rotating tub at a high speed to cause the laundry contained in the rotating tub to be in constant contact with an inner peripheral surface of the rotating tub without falling down, by virtue of a centrifugal force generated during the rotation of the rotating tub, the control unit supplying the steam from the steam generating unit into the rotating tub during the high-speed rotation of the rotating tub, to increase the internal temperature of the rotating tub and the temperature of the laundry.

12 Claims, 5 Drawing Sheets

FIG 5
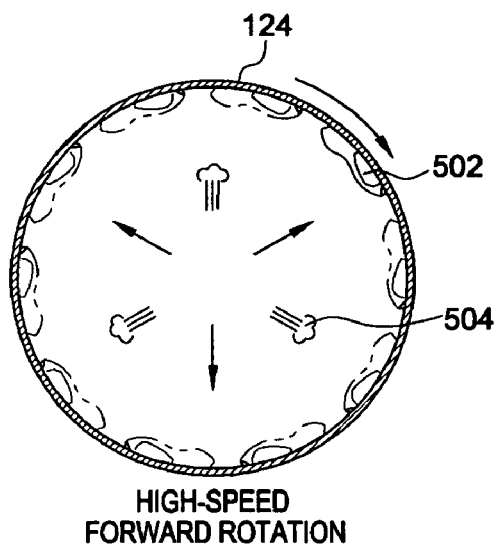
FIG. 5A
HIGH-SPEED
FORWARD ROTATION
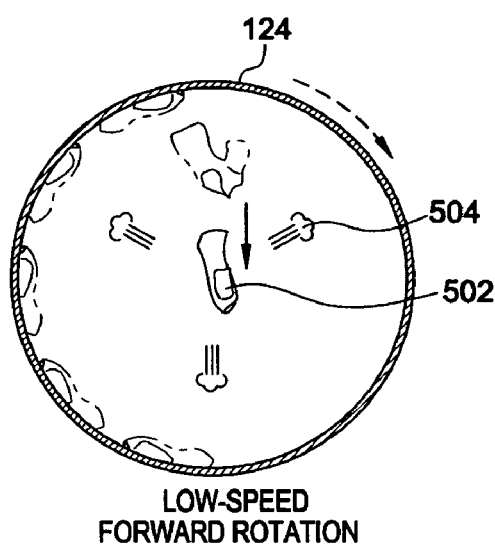
FIG. 5B
LOW-SPEED
FORWARD ROTATION
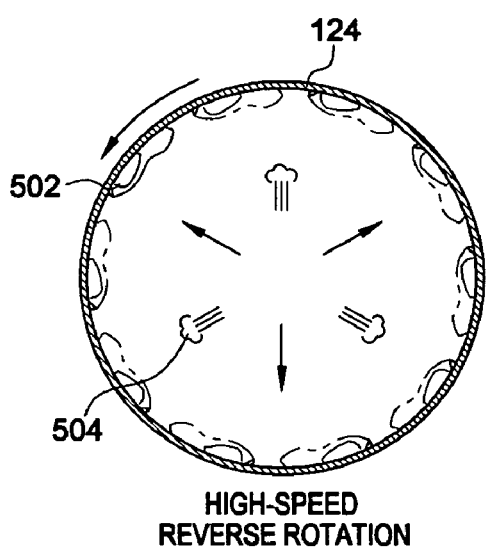
FIG. 5C
HIGH-SPEED
REVERSE ROTATION
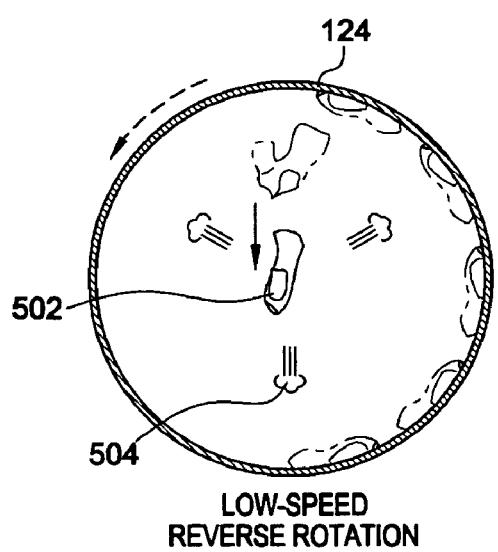
FIG. 5D
LOW-SPEED
REVERSE ROTATION

WASHING MACHINE AND CONTROL METHOD THEREOF

CROSS-REFERENCE TO RELATED APPLICATION

This application claims the benefit of Korean Patent Application No. 2003-95535, filed on Dec. 23, 2003 in the Korean Intellectual Property Office, the disclosure of which is incorporated herein by reference.

BACKGROUND OF THE INVENTION

1. Field of the Invention

Apparatuses and methods consistent with the present invention relate to a washing machine and, more particularly, to a washing machine wherein wash water is heated so that wash and rinse cycles are carried out, using hot water.

2. Description of the Related Art

Drum type washing machines, in which laundry is raised, together with wash water, along a cylindrical rotating tub containing the laundry and wash water, and subsequently falls down, during rotation of the cylindrical rotating tub, such that it is washed by virtue of an impact applied thereto when it falls down, are well known. Such a drum type washing machine includes a water tub for containing wash water, a rotating tub rotatably mounted in the water tub, and provided with through holes for spin-drying at a peripheral wall thereof, and a heater for heating the wash water contained in the water tub. During a wash cycle of the drum type washing machine, washing of laundry is carried out as the rotating tub rotates within the water tub at a relatively low speed under the condition in which wash water and detergent have been supplied into the water tub. In order-to effectively wash the laundry, the wash water is used in the wash cycle in a state of being heated by the heater.

However, such a conventional washing machine has a problem in that a great deal of time is required to heat the wash water to a desired wash temperature because a large amount of wash water contained in the water tub is heated entirely by the heater, which is disposed at the bottom of the water tub, so that the overall wash time is increased.

Furthermore, the conventional washing machine involves waste of wash water because the wash water fills even a heater case installed at the bottom of the water tub. Waste of energy is also caused by the fact that it is necessary to heat the water contained in the heater case.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Therefore, it is an aspect of the invention is to provide a drum type washing machine in which wash water and laundry contained in a rotating tub are heated by steam supplied into the rotating tub, so as to rapidly raise the temperature of the wash water and laundry, thereby being capable of reducing the total wash time while reducing the amount of wash water to be used, and reducing the consumption of energy caused by heating of the wash water.

Another aspect of the invention is to provide a control method for the drum type washing machine adapted to accomplish the above object of the invention, which is capable of reducing the total wash time while reducing the amount of wash water to be used, and the consumption of energy caused by heating of the wash water.

In accordance with one aspect, the present invention provides a washing machine comprising: a rotating tub which washes laundry contained therein in accordance with rotation thereof; a steam generating unit which heats water supplied thereto, thereby generating steam; and a control unit which controls rotation of the rotating tub at a high speed causing the laundry contained in the rotating tub to be in constant contact with an inner peripheral surface of the rotating tub without falling down, by virtue of a centrifugal force generated during the rotation of the rotating tub, the control unit controlling supply of the steam from the steam generating unit into the rotating tub during the high-speed rotation of the rotating tub, to increase an internal temperature of the rotating tub.

In accordance with another aspect, the present invention provides a control method for a washing machine, the control method comprising the steps of: rotating a rotatable tub at a high speed causing laundry contained in the rotating tub to be in contact with an inner peripheral surface of the rotating tub without falling down, and supplying steam into the rotating tub during the high-speed rotation of the rotating tub, to increase an internal temperature of the rotating tub.

In accordance with another aspect, the present invention provides a control method for a washing machine including a rotating tub for washing laundry contained therein in accordance with rotation thereof, and a steam generating unit for heating water supplied thereto, thereby generating steam, the control method comprising the steps of: rotating the rotating tub at a high speed causing the laundry contained in the rotating tub to be in constant contact with an inner peripheral surface of the rotating tub without falling down, by virtue of a centrifugal force generated during the rotation of the rotating tub; and supplying the steam from the steam generating unit into the rotating tub during the high-speed rotation of the rotating tub, to increase an internal temperature of the rotating tub.

In accordance with still another aspect, the present invention provides a control method for a washing machine including a rotating tub for washing laundry contained therein in accordance with rotation thereof, and a steam generating unit for heating water supplied thereto, thereby generating steam, the control method comprising the steps of: supplying wash water into the rotating tub, prior to the high-speed rotation of the rotating tub, to wet the laundry by the wash water; rotating the rotating tub at a high speed causing the laundry contained in the rotating tub to be in constant contact with an inner peripheral surface of the rotating tub without falling down, by virtue of a centrifugal force generated during the rotation of the rotating tub; and supplying the steam from the steam generating unit into the rotating tub during the high-speed rotation of the rotating tub, to increase an internal temperature of the rotating tub.

BRIEF DESCRIPTION OF THE DRAWINGS

The above aspects, and other features and advantages of the present invention will become more apparent after reading the following detailed description when taken in conjunction with the drawings, in which:

FIGS. 5A to 5D are schematic views illustrating respective states of the laundry in the rotating tub varying in accordance with the control method shown in FIG. 4.

DETAILED DESCRIPTION OF ILLUSTRATIVE, NON-LIMITING EMBODIMENTS OF THE INVENTION

Figure 1:
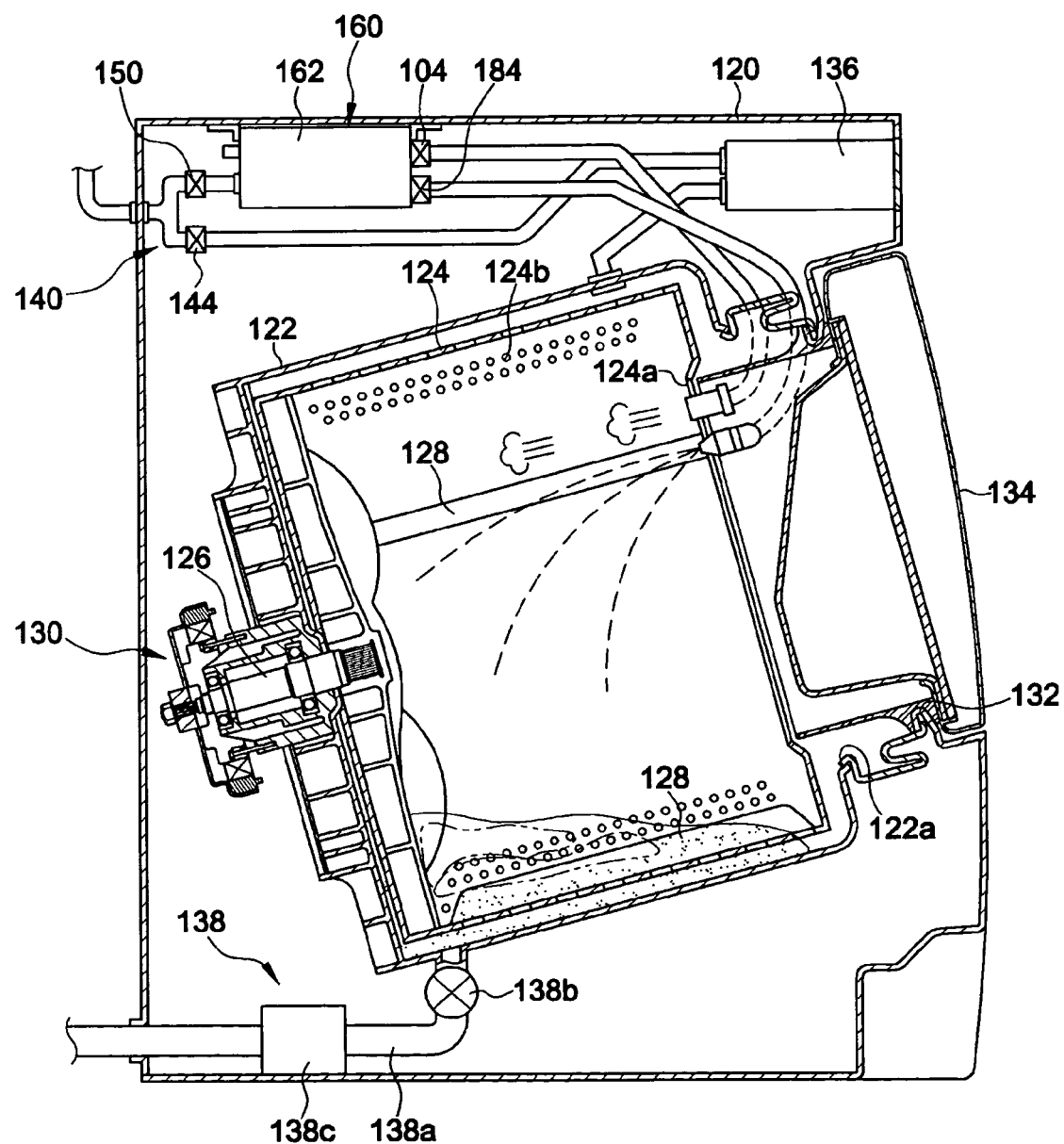
FIG. 1 is a sectional view illustrating the configuration of a drum type washing machine according to an exemplary embodiment of the present invention.

An illustrative, non-limiting embodiment of the present invention will now be described in detail with reference to FIGS. 1 to 4. FIG. 1 is a sectional view illustrating the configuration of a drum type washing machine according to an exemplary embodiment of the present invention. As shown in FIG. 1, the drum type washing machine includes a cabinet 120, a drum-shaped water tub 122 mounted in the cabinet 120, and adapted to contain wash water, and a drum-shaped rotating tub 124 rotatably mounted in the water tub 122.

The rotating tub 124 has a rotating shaft 126 fixedly mounted to the central portion of a rear wall thereof. The rotating shaft 126 is rotatably coupled to the central portion of a rear wall of the water tub 122, so that the rotating tub 124 is rotatable within the water tub 122. A plurality of through holes 124b are provided at a peripheral wall of the rotating tub 124. A plurality of lifters 128 are provided at the inner surface of the rotating tub 124 at the peripheral wall thereof in order to cause laundry contained in the rotating tub 124 to repeatedly rise and fall down during rotation of the rotating tub 124.

A driving unit, for example, a motor 130, is mounted to the rear wall of the water tub 122 outside the water tub 122, so as to rotate the rotating shaft 126 mounted to the rotating tub 124. An access opening 132 is formed at a front wall of the cabinet 120. The access opening 132 is aligned with access openings 122a and 124a respectively formed at the water tub 122 and rotating tub 124, so as to allow the user to put laundry into the rotating tub 124 and to take laundry out of the rotating tub 124. Mounted to the access opening 132 is a door 134 adapted to open and close the access opening 132.

Arranged at an upper portion of the water tub 122 are a detergent supply unit 136, a steam generating unit 160, and a water supply unit 140. The detergent supply unit 136 serves to supply detergent into the water tub 122, the steam generating unit 160 serves to supply steam and hot water into the water tub 122, and the water supply unit 140 serves to supply water to both the water tub 122 and the steam generating unit 160. A drainage unit 138 is mounted at a lower portion of the water tub 122 in order to drain water from the water tub 122. The drainage unit 138 includes a drainage tube 138a, a drainage valve 138b, and a drainage motor 138c.

In FIG. 1, reference numeral 104 designates a steam supply valve, and reference numerals 144 and 150 designate first and second water supply valves, respectively. Also, reference numeral 184 designates a wash water supply valve.

When the washing machine starts to operate under the condition in which laundry has been put into the rotating tub 124, and detergent has been put into the detergent supply unit 136, the first and second water supply valves 144 and 150 are opened under control of a control unit (FIG. 2), so that water is supplied to both the detergent supply unit 136 and the steam generating unit 160. The detergent put into the detergent supply unit 136 is supplied to the water tub 122 in a state of being dissolved in the water supplied to the detergent supply unit 136, as the water is introduced into the water tub 122 via the detergent supply unit 136.

Meanwhile, the steam supply valve 104, which is connected between the steam generating unit 160 and the rotating tub 124, is initially maintained in a closed state. Accordingly, the water supplied to the steam supply unit 160 fills a heating tank 162 included in the steam supply unit 160. Once water fills the heating tank 162, it is heated by a heater (FIG. 2) installed in the heating tank 162, thereby generating steam. When steam is generated, the control unit (FIG. 2) opens the steam supply valve 104, thereby causing the steam to be introduced into the water tub 122. Thus, the wash water contained in the water tub 122 is heated by the steam. This steam supply operation is continued until the temperature of the wash water in the water tub 122 increases to a predetermined wash temperature. For example, where the predetermined wash temperature is 60° C., steam is continuously supplied until the wash water in the water tub 122 is heated to 60° C. by the supplied steam. In this case, the water level and water temperature in the water tub 122 are sensed by separate water level and temperature sensors (FIG. 2) installed at the water tub 122, respectively. The wash water supply valve 184 is adapted to supply wash water in an unheated state to the water tub 122.

Figure 2:
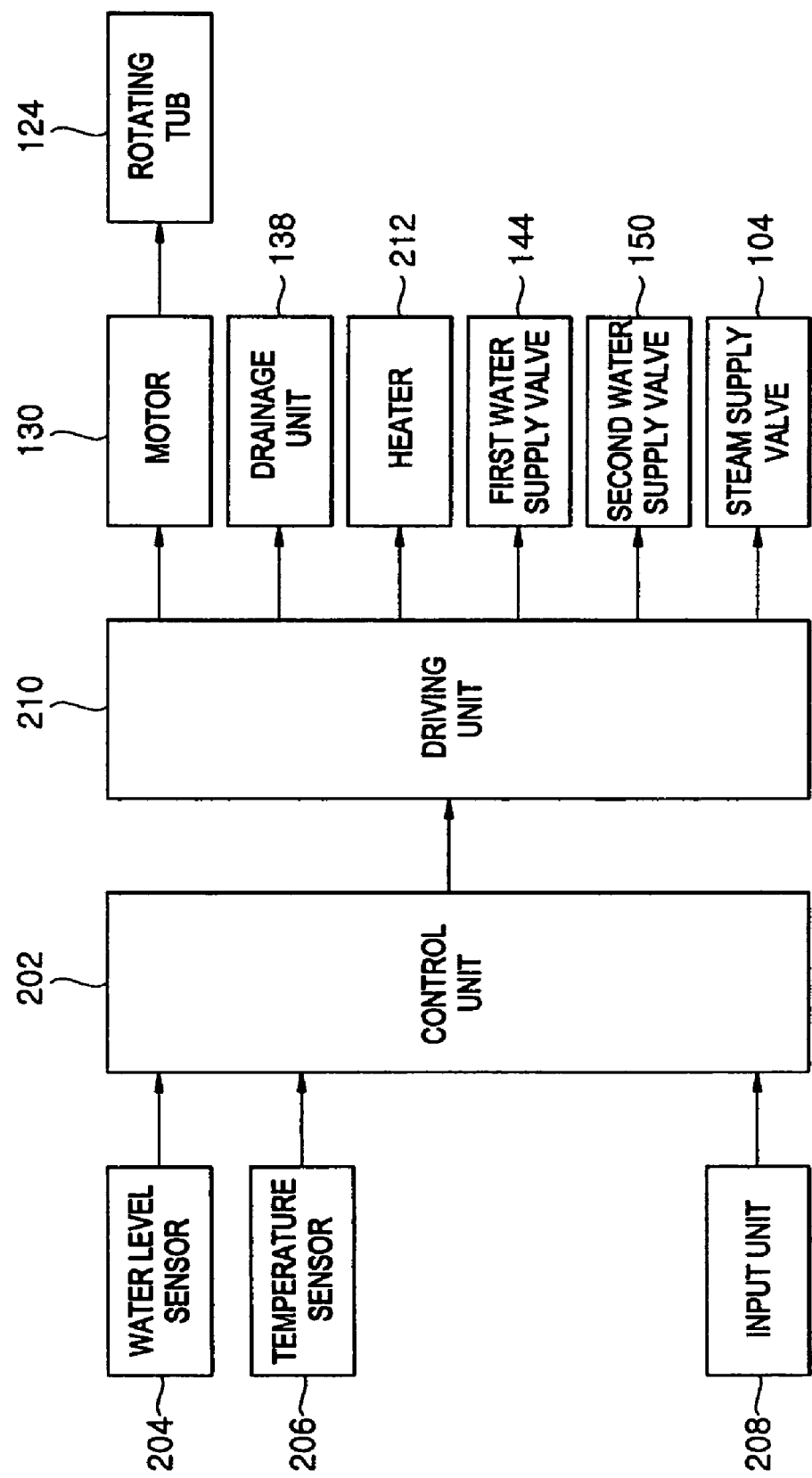
FIG. 2 is a block diagram illustrating a control system of the drum type washing machine shown in FIG. 1.

FIG. 2 is a block diagram illustrating a control system of the drum type washing machine shown in FIG. 1. Referring to FIG. 2, a control unit 202 is illustrated which controls the overall operation of the washing machine involving, for example, wash, rinse, spin-dry, and dry cycles. Connected to an input of the control unit 202 are a water level sensor 204, a temperature sensor 206, and an input unit 208. The water level sensor 204 detects the amount of wash water supplied to the water tub 122, whereas the temperature sensor 206 serves to detect the temperature of the wash water supplied to the water tub 122. The input unit 208 allows the user to set a desired wash course, or to select a desired cycle.

A driving unit 210 is connected to an output of the control unit 202. The driving unit 210 drives various elements of the washing machine, for example, the motor 130, drainage unit 138, heater 212, first and second water supply valves 144 and 150, and steam supply valve 104. The heater 212 is adapted to heat water filling the heating tank 162, thereby generating steam. The first and second water supply valves 144 and 150 are adapted to allow the water supplied from the water supply unit 140 to be introduced into the water tub 122 and steam generating unit 160, respectively. The steam supply valve 104 serves to supply steam generated in the steam generating unit 160 to the water tub 122.

In order to heat wash water and laundry contained in the water tub 122 prior to execution of a wash cycle, the control unit 202 performs a control operation for supplying steam generated in the steam generating unit 160 to the water tub 122. In this case, heating of laundry means heating of wash water absorbed in the laundry. In order to rapidly and uniformly heat the laundry, steam for heating the laundry is supplied under the condition in which the laundry is uniformly in contact with the inner peripheral surface of the rotating tub 124 by virtue of a centrifugal force generated as the rotating tub 124 rotates at a high speed sufficient to prevent the laundry from falling down. This can be achieved by a control method according to an exemplary embodiment of the present invention. This control method will now be described in conjunction with FIGS. 3 to 6.

Figure 3:
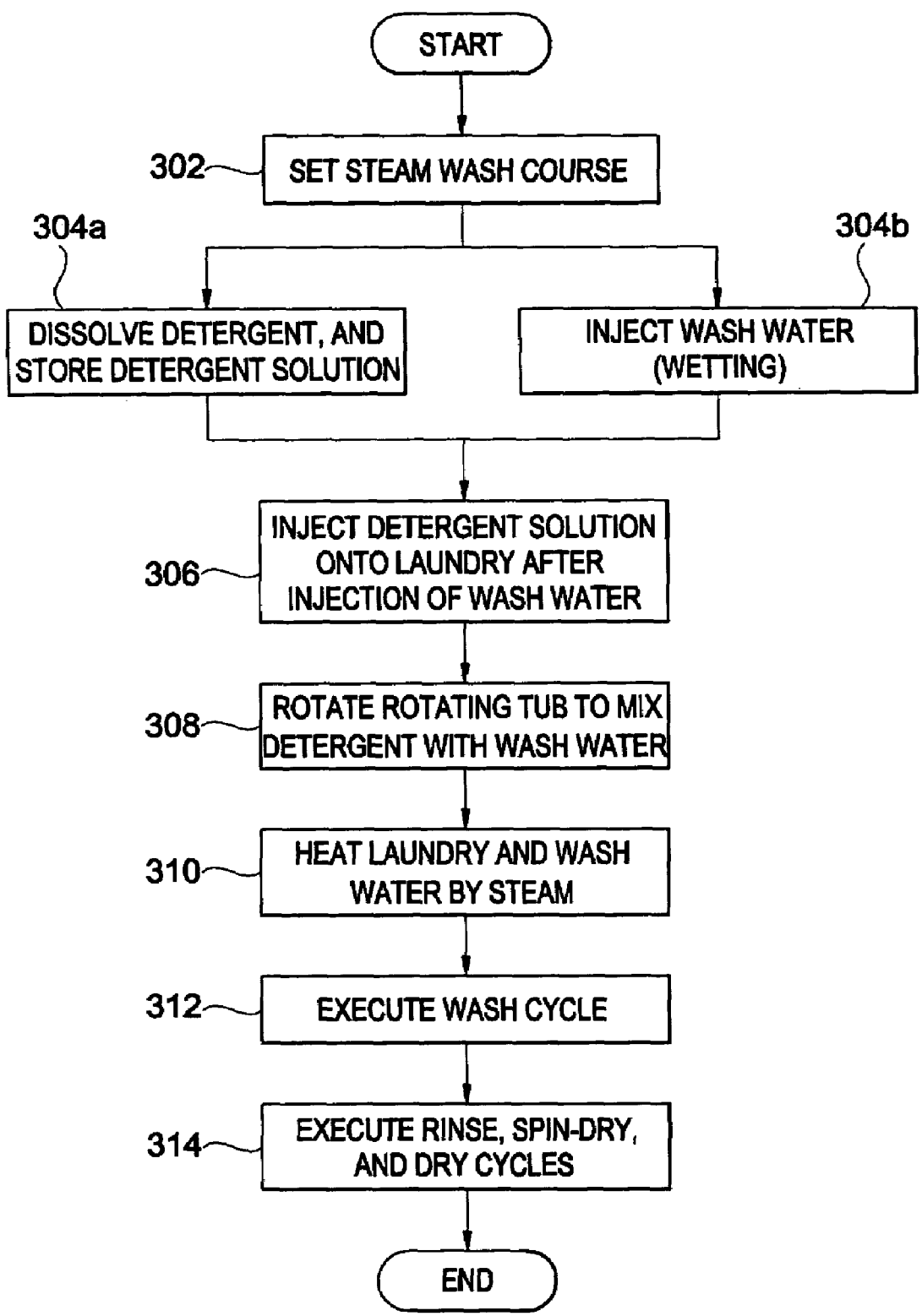
FIG. 3 is a flow chart illustrating a control method for a drum type washing machine in accordance with an exemplary embodiment of the present invention.

FIG. 3 is a flow chart illustrating a control method for a drum type washing machine in accordance with an exemplary embodiment of the present invention. In accordance with this control method, as shown in FIG. 3, when a steam wash course is set by the user (Step 302), the first and second water supply valves 144 and 150 are opened, so that water is supplied to both the detergent supply unit 136 and the steam generating unit 160. The water supplied into the detergent supply unit 136 dissolves detergent contained in the detergent supply unit 136. Thus, the detergent supply unit 136 stores a detergent solution having a desired detergent concentration (Step 304a). Simultaneously, the wash water supply valve 184 is opened, so that wash water is injected into the rotating tub 124 to permeate into laundry contained in the rotating tub 124 (Step 304b). After the process of injecting wash water onto the laundry, the wash water supply valve 184 is closed. Subsequently, the water supplied to the steam generating unit 160 is heated to generate steam.

Meanwhile, the detergent solution stored in the detergent supply unit 136 is injected onto the laundry wetted in accordance with the injection of wash water (Step 306). Since detergent is injected onto the laundry in the form of the detergent solution, it is possible to prevent the laundry from being stained by undissolved detergent, and to avoid a degradation in wash effect. After completion of the supply of wash water and the injection of detergent, rotation of the rotating tub 124 is carried out in order to uniformly mix the detergent with the wash water (Step 308). In this case, the rotating tub 124 is alternately rotated in forward and reverse directions in order to obtain an enhanced mixing effect.

Following the complete supply of wash water and detergent, the steam supply valve 104 is opened to supply steam into the rotating tub 124. Since the rotating tub 124 is arranged inside the water tub 122 while communicating with the water tub 122, the steam supplied into the rotating tub 124 is also transferred to the water tub 122. Thus, steam is supplied to both the rotating tub 124 and the water tub 122. As a result, the wash water contained in the water tub 122 and rotating tub 124 and the wash water and detergent permeating the laundry contained in the rotating tub 124 are heated by the supplied steam (Step 310).

After execution of step 310 for heating the laundry (including the supplied detergent) using steam, a wash cycle involved in the set steam wash course is executed (Step 312). At this time, additional steam may be supplied, so as to maintain the interior of the rotating tub 124 at a predetermined high temperature. After completion of the wash cycle, rinse, spin-dry and dry cycles are partially or entirely executed to complete the steam wash course (Step 314).

In the control method illustrated in FIG. 3, it is important to heat uniformly the laundry contained in the rotating tub 124 at the step for heating wash water using steam. In particular, in the case of a drum type washing machine, it is desirable to use a reduced amount of wash water, in order to obtain a sufficient fall of laundry in a rotating tub, because washing of the laundry is achieved as the laundry falls down during rotation of the rotating tub. In this case, most of the wash water supplied into the rotating tub permeates into the laundry. In order to effectively heat the wash water using steam, accordingly, it is necessary to heat uniformly the laundry wetted by the wash water. Where the rotating tub is rotated at low speed during the laundry heating process, however, it is difficult to achieve uniform heating of the laundry because the laundry is moved in a lumped state. In accordance with the present invention, therefore, the rotating direction and speed of the rotating tub 124 at the step of heating laundry by steam is controlled to heat uniformly the laundry.

Figure 4:
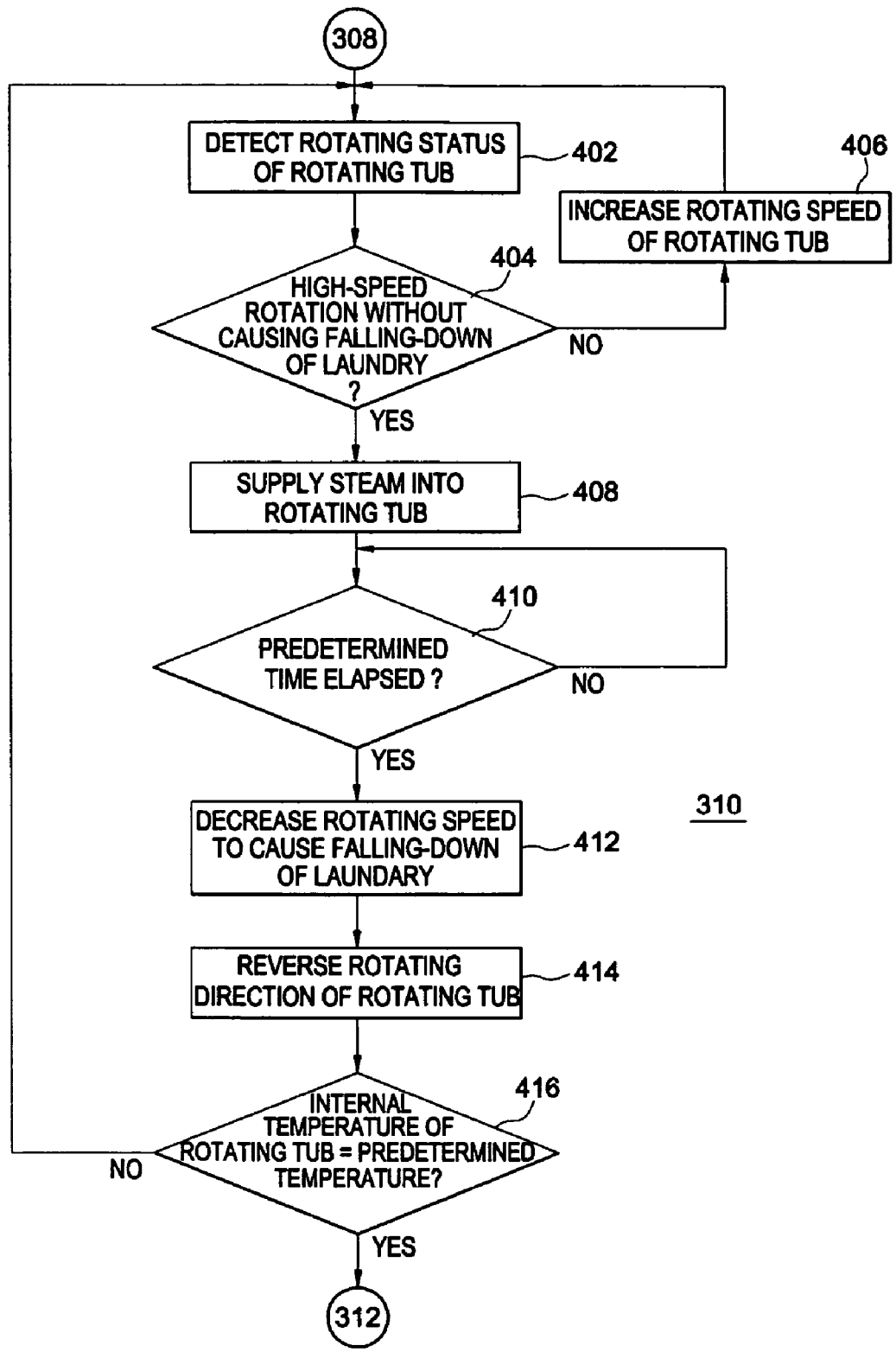
FIG. 4 is a flow chart illustrating the process of heating laundry and wash water at step 310 in the drum type washing machine control method shown in FIG. 3.

FIG. 4 is a flow chart illustrating the process of heating laundry and wash water at step 310 in the drum type washing machine control method shown in FIG. 3. In accordance with the present invention, this process is carried out under the condition in which the rotating tub 124 is alternately rotated at high speed in forward and reverse directions in respective forward and reverse high-speed rotation durations, while being rotated at low speed in a low-speed rotation duration defined between the forward and reverse high-speed rotation durations, so as to displace the position of the laundry in the rotating tub 124.

In this process, as shown in FIG. 4, the rotating status, that is, the rotating direction and speed, of the rotating tub 124 is first detected (Step 402). Based on the detected result, it is determined whether or not the rotating tub 124 rotates in one direction, for example, the forward direction, at a high speed sufficient to cause the laundry to be in constant contact with the inner peripheral surface of the rotating tub 124 by virtue of a centrifugal force generated in accordance with the rotation of the rotating tub 124 (Step 404). If it is determined at step 404 that the rotating tub 124 rotates at an insufficient speed, the rotating speed of the rotating tub 124 is then increased to a predetermined high speed (406). On the other hand, where the rotating tub 124 rotates at a high speed sufficient to generate a centrifugal force preventing the laundry from falling down, steam is supplied into the rotating tub 124, so as to heat the laundry (Step 408). After the rotating tub 124 rotates at high speed for a predetermined time (Step 410), its rotating speed is decreased to a predetermined low speed, at which the laundry falls down in the rotating tub 124 (Step 412). As a result, the laundry, which rotates at the same speed as the rotating tub 124 in a state of being in contact with the inner peripheral surface of the rotating tub 124, falls down by virtue of gravity, so that it is displaced in position while being turned over. Accordingly, portions of the laundry not exposed to steam may be directly exposed to the steam. After the low-speed rotation duration, the rotating direction of the rotating tub 124 is reversed. During the reverse rotation of the rotating tub 124, steam is continuously supplied into the rotating tub 124, thereby uniformly heating the entire portion of the laundry (Step 414). The above procedure is repeatedly executed until the temperature of the laundry, which may be measured based on the internal temperature of the rotating tub 124, reaches a predetermined temperature (Step 416).

FIGS. 5A to 5D are schematic views illustrating respective states of the laundry in the rotating tub varying in accordance with the control method shown in FIG. 4. When the rotating tub 124 rotates in the forward direction at high speed, as shown in FIG. 5A, laundry 502 is uniformly distributed in the rotating tub 124 while being in contact with the inner peripheral surface of the rotating tub 124. As steam 504 comes into contact with the exposed surface of the laundry 502, the laundry 502 is heated. If the high-speed rotation of the rotating tub 124 is continuously carried out only in one direction, it is difficult to achieve uniform heating of the laundry 502 because the steam 504 comes into contact with only one-side surface of the laundry 402. To this end, the rotating tub 124 is rotated at low speed after the high-speed rotation thereof for a predetermined time. In accordance with the low-speed rotation of the rotating tub 124, the laundry 502 falls down by virtue of gravity, so that it is displaced in position, as shown in FIG. 5B. Subsequently, the rotating tub 124 is rotated in a reverse direction at high speed, so as to cause the laundry 502 to be uniformly distributed in the rotating tub 124 while being in contact with the inner peripheral surface of the rotating tub 124 (FIG. 5C). After a predetermined time elapses, the rotating tub 124 is rotated in the reverse direction at low speed, so as to displace the position of the laundry 502 (FIG. 5D).

As apparent from the above description, in accordance with the present invention, wash water and laundry contained in the rotating tub are heated by steam supplied into the rotating tub. Accordingly, it is possible to rapidly increase the temperature of the wash water and laundry, thereby achieving a reduction in wash time while reducing the amount of wash water to be used, and the consumption of energy required to heat the wash water.

Although exemplary embodiments of the invention have been disclosed for illustrative purposes, those skilled in the art will appreciate that various modifications, additions and substitutions are possible, without departing from the scope and spirit of the invention as set forth in the accompanying claims.

What is claimed is:

1. A control method for a washing machine including a rotating tub for washing laundry contained therein in accordance with rotation thereof, and a steam generating unit for heating water supplied thereto, thereby generating steam, the control method comprising:
    supplying a detergent solution to the rotating tub after applying wash water to the rotating tub;
    rotating the rotating tub at a high speed causing the laundry wetted with detergent and wash water contained in the rotating tub to be in constant contact with an inner peripheral surface of the rotating tub without falling down, by virtue of a centrifugal force generated during the rotation of the rotating tub; and
    supplying the steam from the steam generating unit into the rotating tub during the high-speed rotation of the rotating tub, to increase an internal temperature of the rotating tub and the laundry wetted with detergent and wash water;
    wherein the detergent solution and the steam are supplied during a same wash course prior to a spin-dry cycle.

2. The control method according to claim 1, further comprising:
    heating the wash water by the steam supplied into the rotating tub.

3. The control method according to claim 1, further comprising:
    reducing the rotating speed of the rotating tub, after the high-speed rotation of the rotating tub for a predetermined time, to rotate the rotating tub at a low speed causing the laundry to fall down in the rotating tub, so that the laundry is displaced in position.

4. The control method according to claim 3, wherein the high-speed rotation and low-speed rotation of the rotating tub are carried out in an alternate manner.

5. The control method according to claim 1, wherein the rotating tub is rotated in forward and reverse directions in an alternate manner, while reducing a rotating speed thereof between a duration, in which the rotating tub rotates in the forward direction, and a duration, in which the rotating tub rotates in the reverse direction, to rotate at a low speed causing the laundry to fall down therein, so that the laundry is displaced in position.

6. A control method for a washing machine including a rotating tub for washing laundry contained therein in accordance with rotation thereof, and a steam generating unit for heating water supplied thereto, thereby generating steam, the control method comprising:
    supplying wash water into the rotating tub, prior to a high-speed rotation of the rotating tub, to wet the laundry by the wash water;
    injecting a detergent solution onto the laundry after completion of the supply of wash water into the rotating tub;
    rotating the rotating tub at a high speed causing the laundry wetted with detergent and wash water contained in the rotating tub to be in constant contact with an inner peripheral surface of the rotating tub without falling down, by virtue of a centrifugal force generated during the rotation of the rotating tub; and
    supplying the steam from the steam generating unit into the rotating tub during the high-speed rotation of the rotating tub, to increase an internal temperature of the rotating tub and the laundry wetted with detergent and wash water;
    wherein detergent solution and the steam are supplied during a same wash course prior to a spin-dry cycle.

7. The control method according to claim 6, further comprising:
    supplying water to a detergent supply unit;
    dissolving a detergent in the water in the detergent supply unit to prepare the detergent solution, and storing the prepared detergent solution in the detergent supply unit before injecting the detergent solution onto the laundry.

8. A control method for a washing machine, the control method comprising:
    supplying a detergent solution to the rotating tub after a wash water has been supplied to the rotating tub;
    rotating a rotating tub at a high speed causing laundry wetted with detergent and wash water contained in the rotating tub to be in contact with an inner peripheral surface of the rotating tub without falling down; and
    supplying steam into the rotating tub during the high-speed rotation of the rotating tub containing the laundry wetted with detergent and wash water,
    wherein the detergent solution and the steam are supplied during a same wash course.

9. The control method according to claim 8, further comprising:
    supplying wash water into the rotating tub, prior to the high-speed rotation of the rotating tub, to wet the laundry by the wash water, and
    heating the wash water by the steam supplied into the rotating tub.

10. The control method according to claim 8, further comprising:
    reducing the rotating speed of the rotating tub, after the high-speed rotation of the rotating tub for a predetermined time, to rotate the rotating tub at a low speed causing the laundry to fall down in the rotating tub, so that the laundry is displaced in position.

11. The control method according to claim 10, wherein the high-speed rotation and low-speed rotation of the rotating tub are carried out in an alternate manner.

12. The control method according to claim 8, wherein the rotating tub is rotated in forward and reverse directions in an alternate manner, while reducing a rotating speed thereof between a duration, in which the rotating tub rotates in the forward direction, and a duration, in which the rotating tub rotates in the reverse direction, to rotate at a low speed causing the laundry to fall down therein, so that the laundry is displaced in position.

* * * * *